United States Patent [19]
Shah et al.

[11] Patent Number: 5,551,044
[45] Date of Patent: Aug. 27, 1996

[54] METHOD AND APPARATUS FOR INTERRUPT/SMI# ORDERING

[75] Inventors: Nilesh V. Shah, Folsom; Jeffrey L. Rabe, Rancho Cordova; Zohar Bogin, Folsom, all of Calif.

[73] Assignee: Intel Corporation, Santa Clara, Calif.

[21] Appl. No.: 349,065

[22] Filed: Dec. 1, 1994

[51] Int. Cl.$^6$ ........................................... G06F 13/00
[52] U.S. Cl. ........................ 395/750; 395/733; 395/735
[58] Field of Search ................................. 395/750, 733, 395/735

[56] References Cited

U.S. PATENT DOCUMENTS

| | | | |
|---|---|---|---|
| 4,099,255 | 7/1978 | Stanley et al. | 364/900 |
| 4,639,549 | 1/1987 | Hirayama et al. | 379/62 |
| 5,386,552 | 1/1995 | Garney | 395/575 |

Primary Examiner—Jack B. Harvey
Assistant Examiner—John Travis
Attorney, Agent, or Firm—Blakely, Sokoloff, Taylor & Zafman

[57] ABSTRACT

A circuit for controlling interrupt request signal transmission in a computer system. An input receives an interrupt request from an external component. First circuitry coupled to the input generates a signal in response to the interrupt request from the external component. The signal causes a processor to switch to fully operational mode. Second circuitry coupled to the input generates an interrupt request signal to the processor in response to the interrupt request from the external component. A signal processing circuit coupled to the second circuitry suppresses transmission of the interrupt request signal to the processor until the signal is transmitted to the processor.

11 Claims, 14 Drawing Sheets

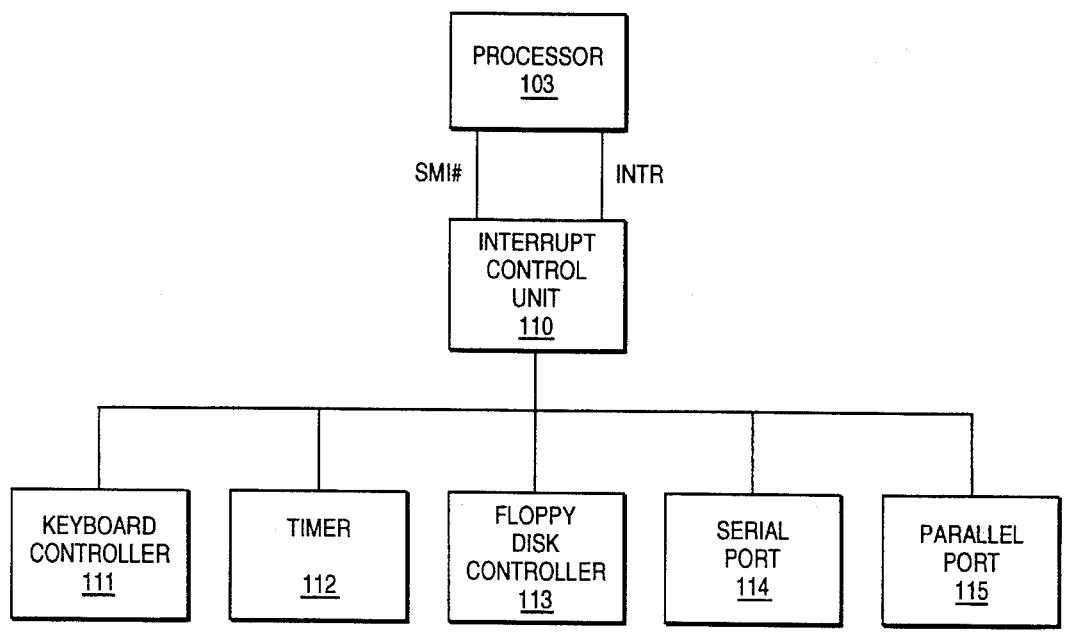
FIG_1
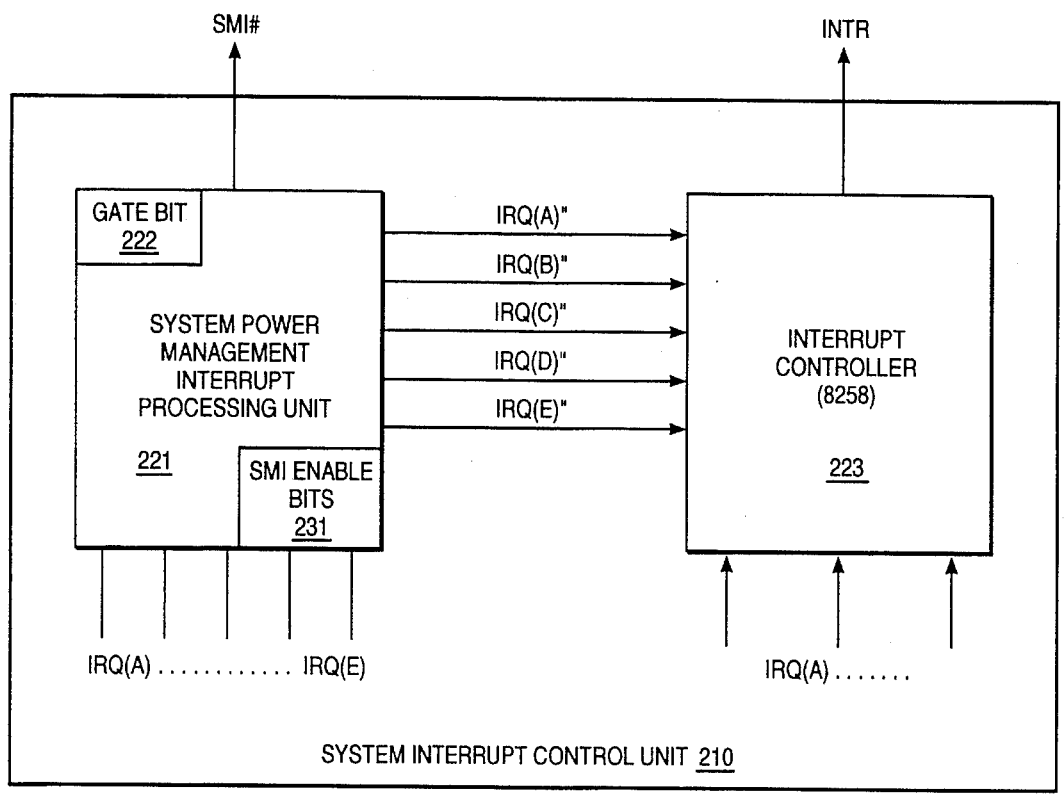
FIG_2

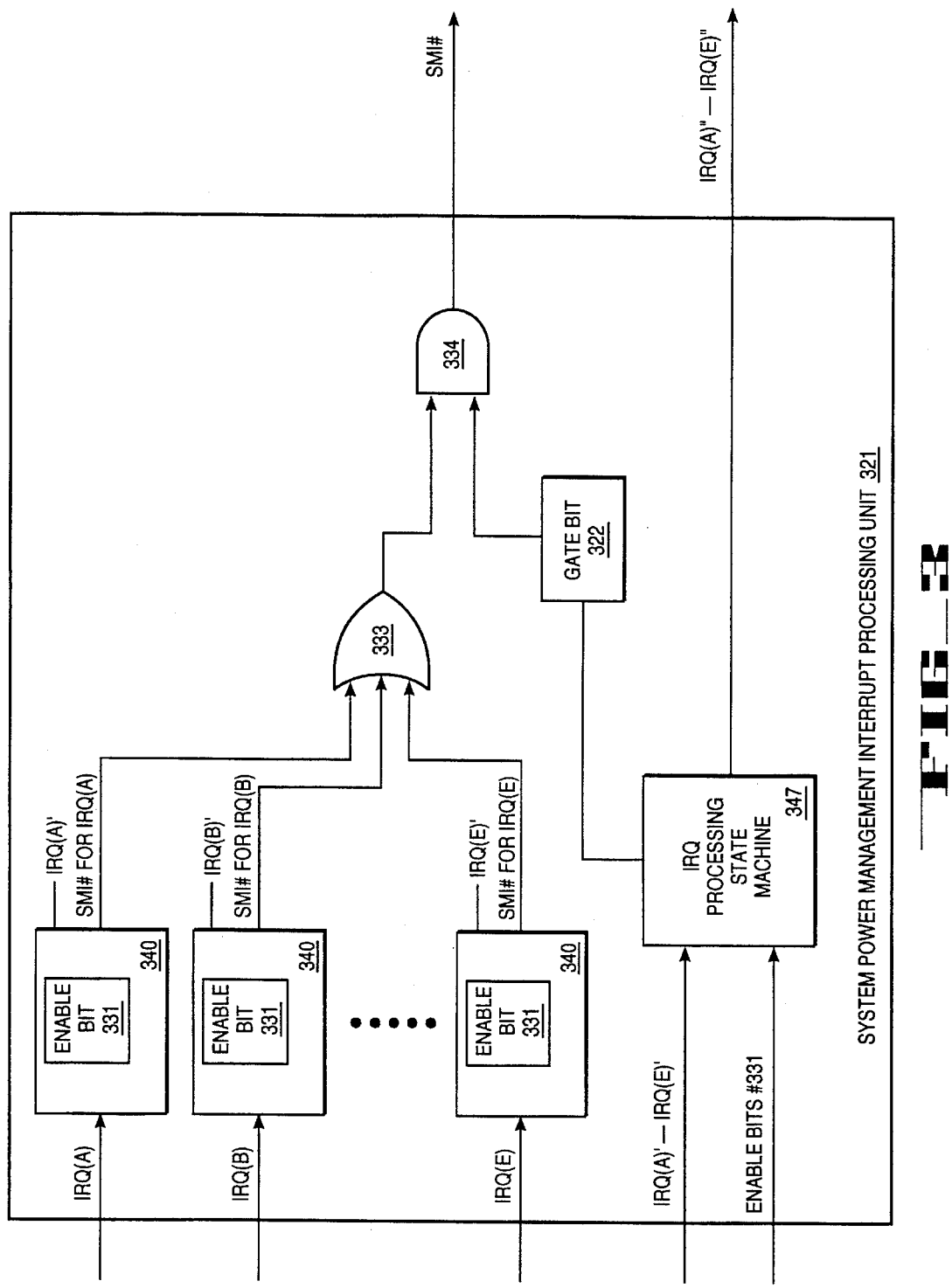
FIG_3

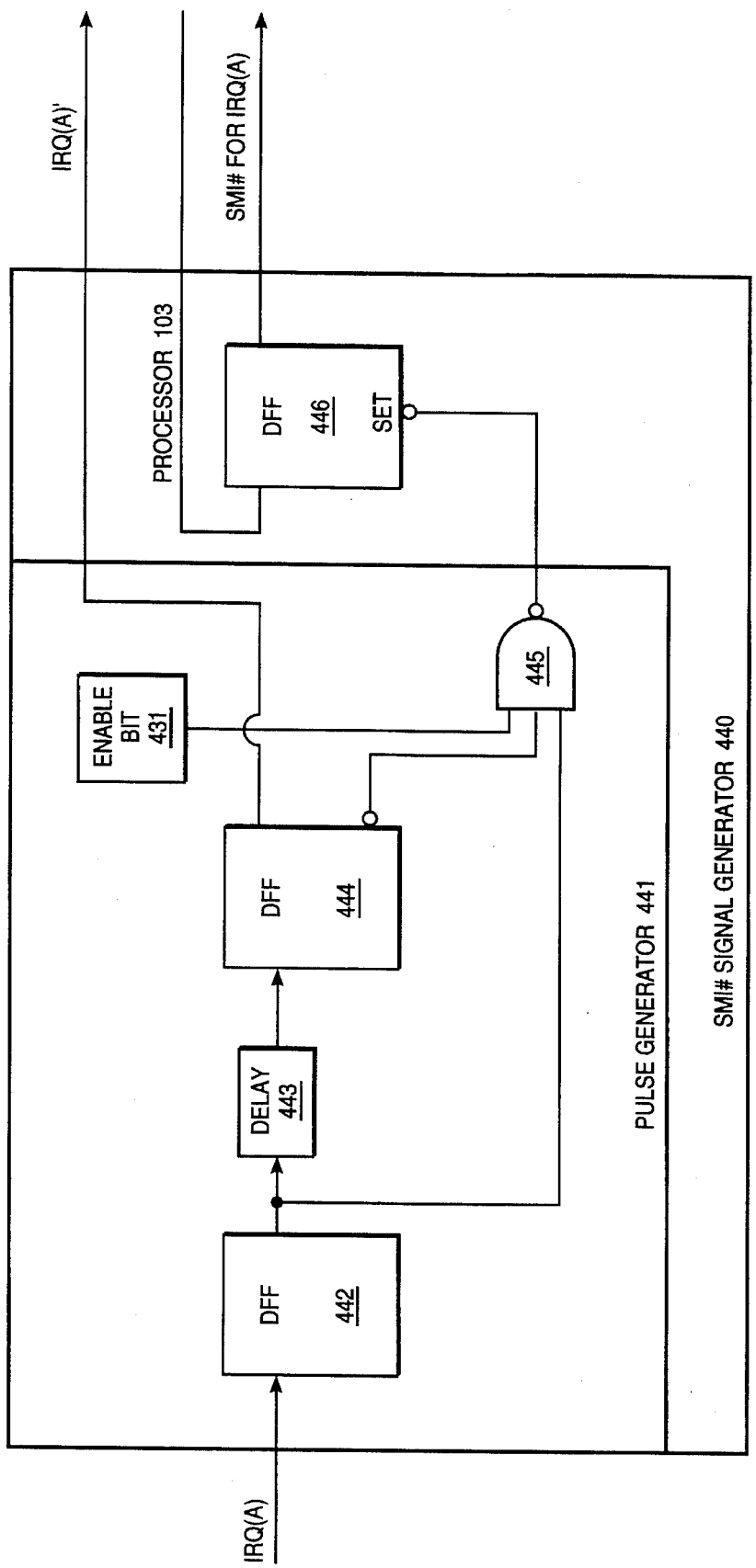
FIG_4

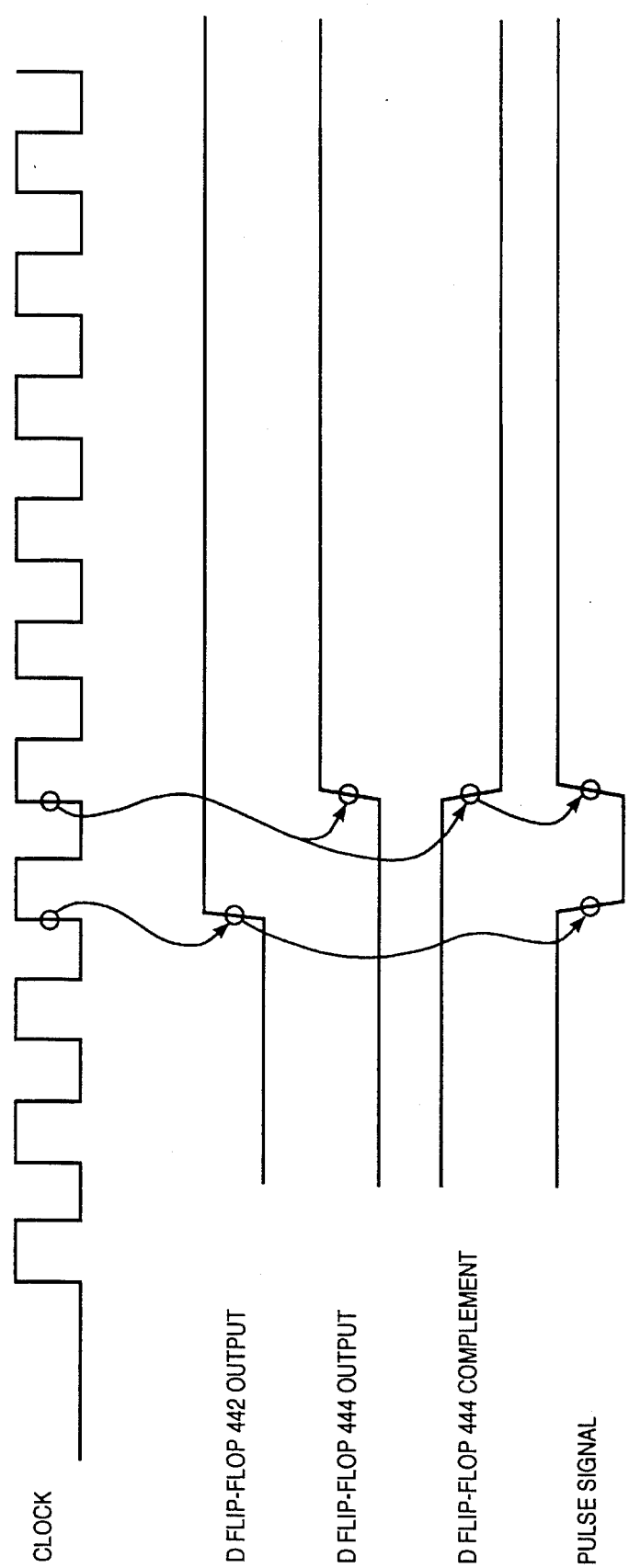

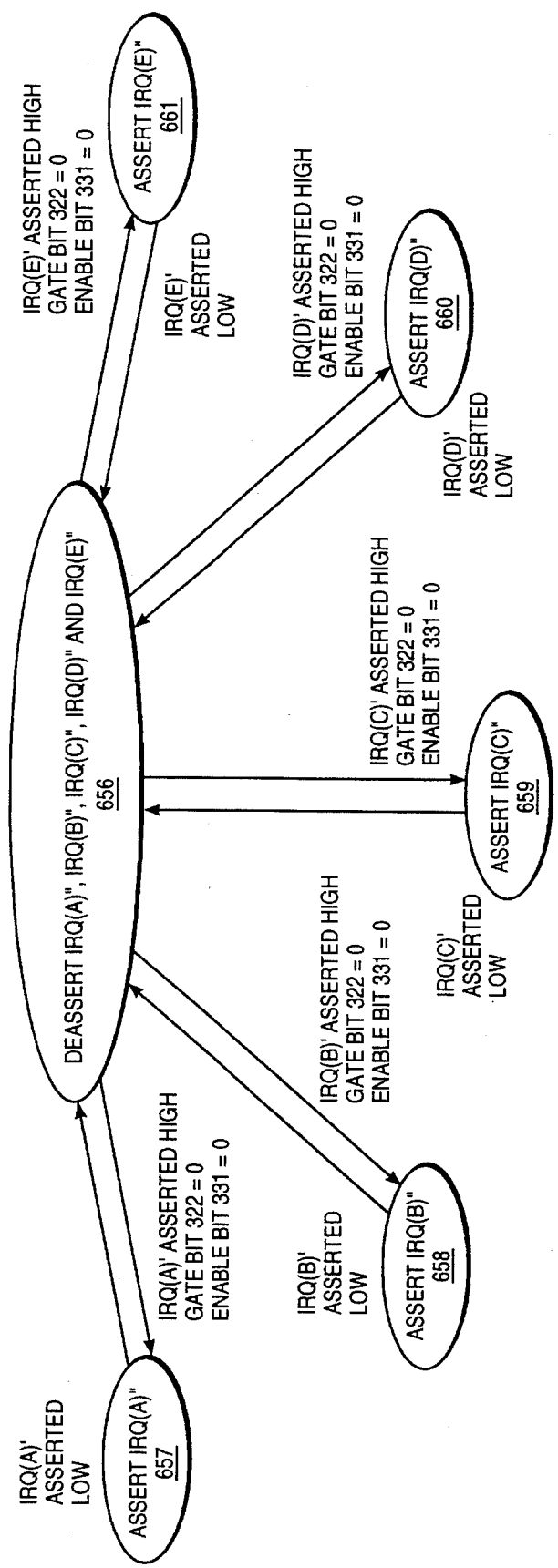
FIG_6

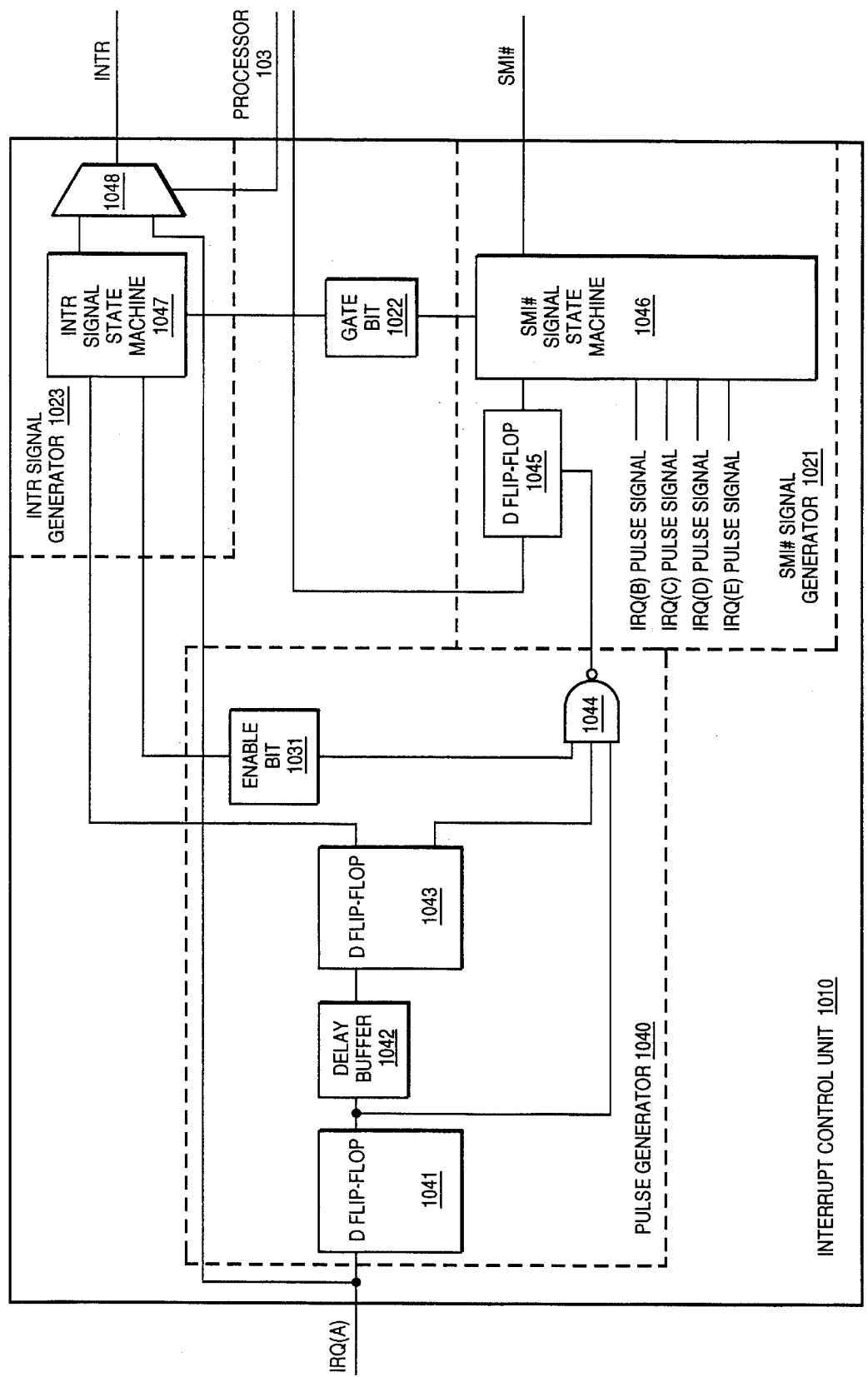
FIG_7

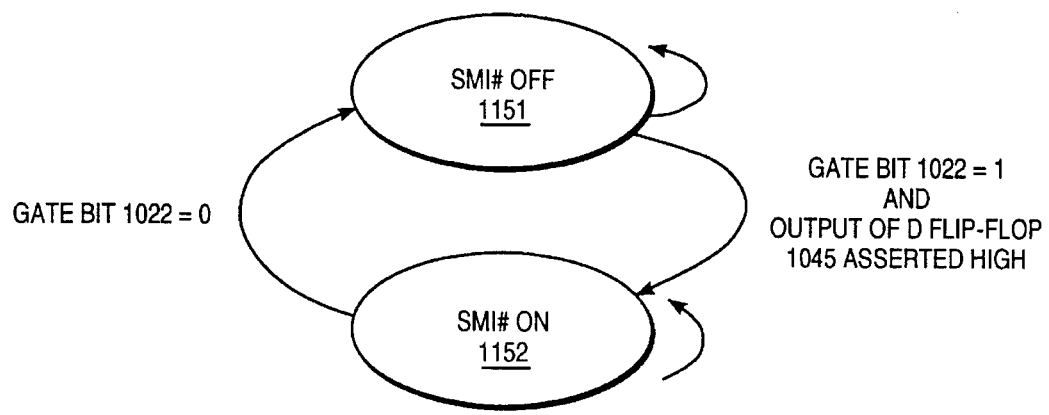
FIG_8
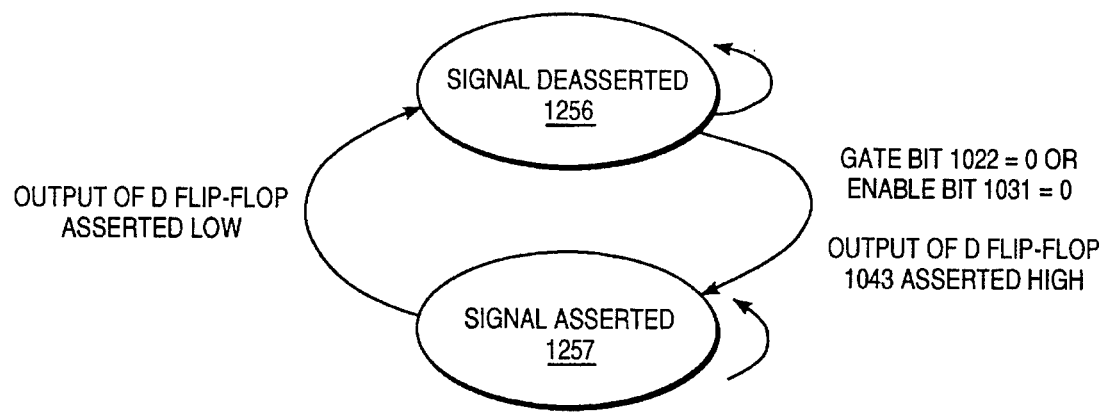
FIG_9

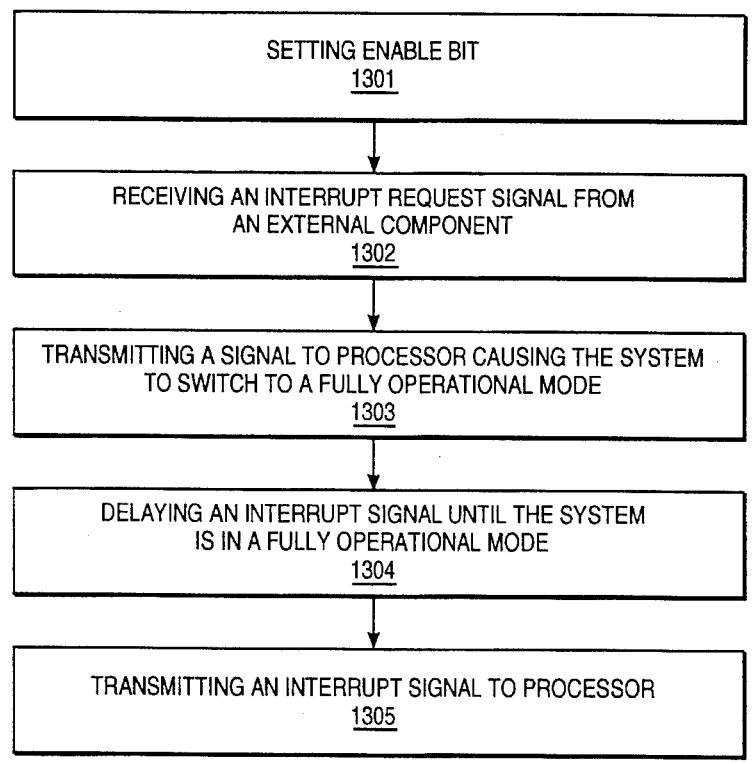
FIG_10
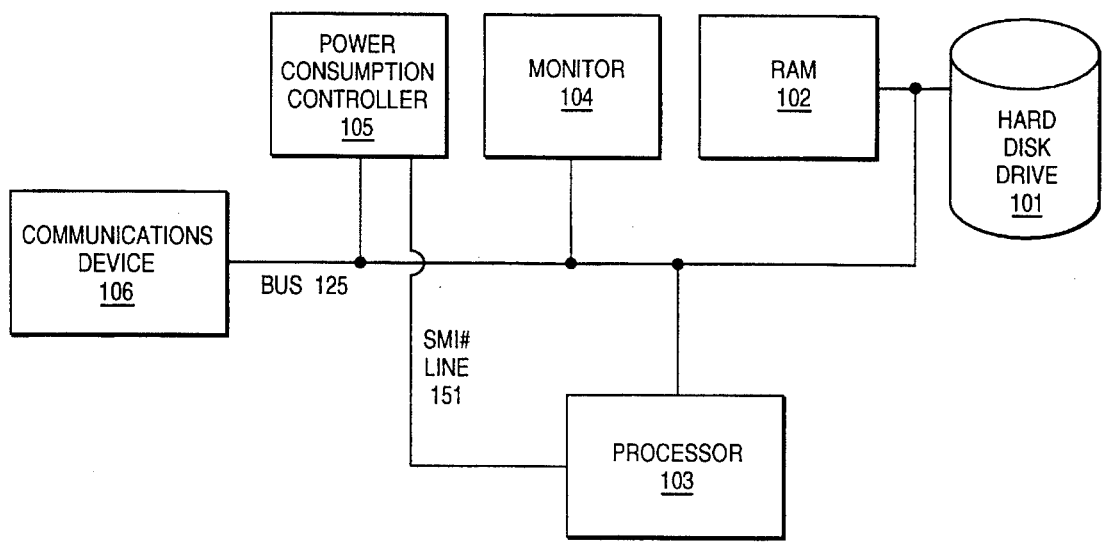
FIG_11

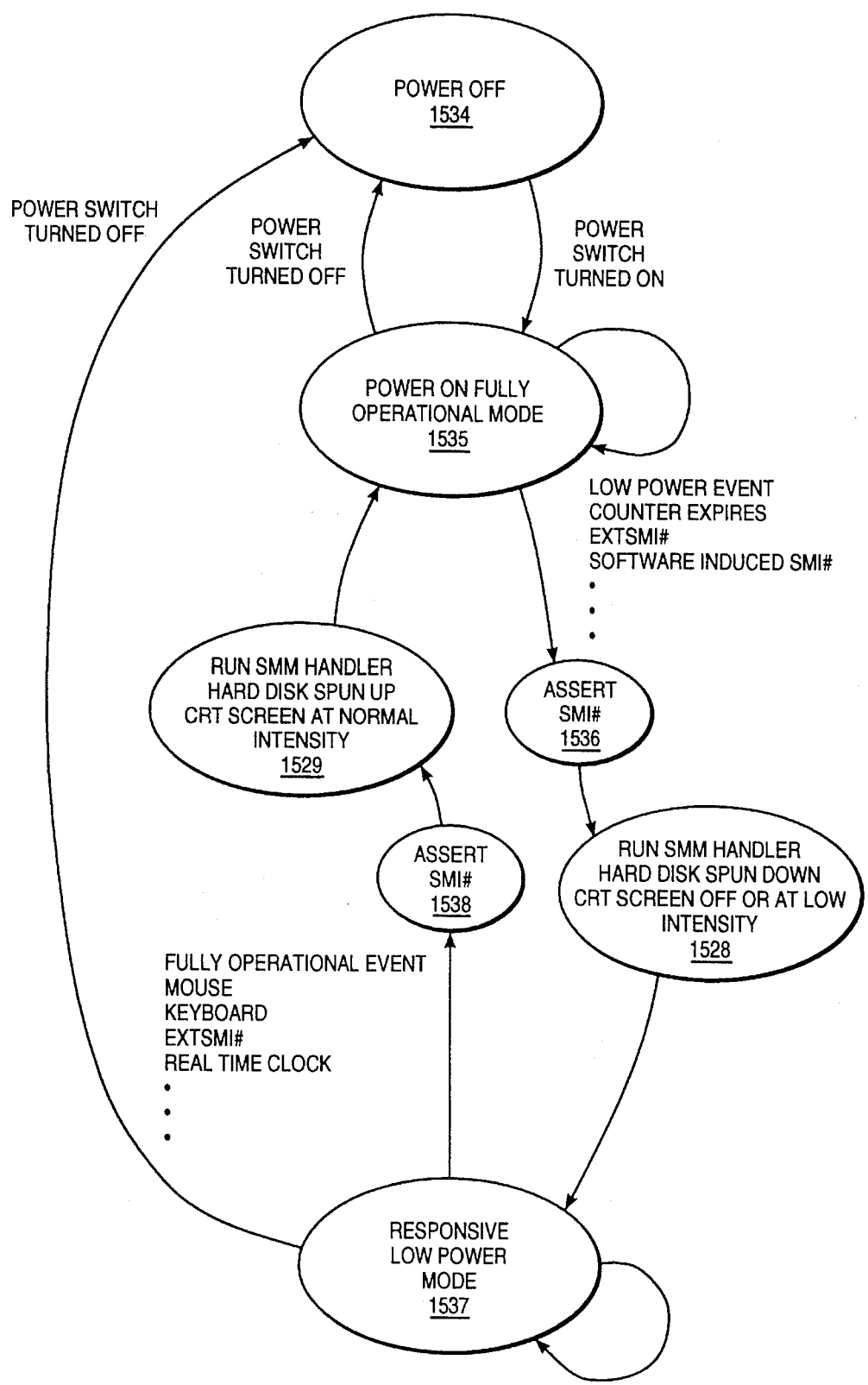
FIG_12

FIG_15

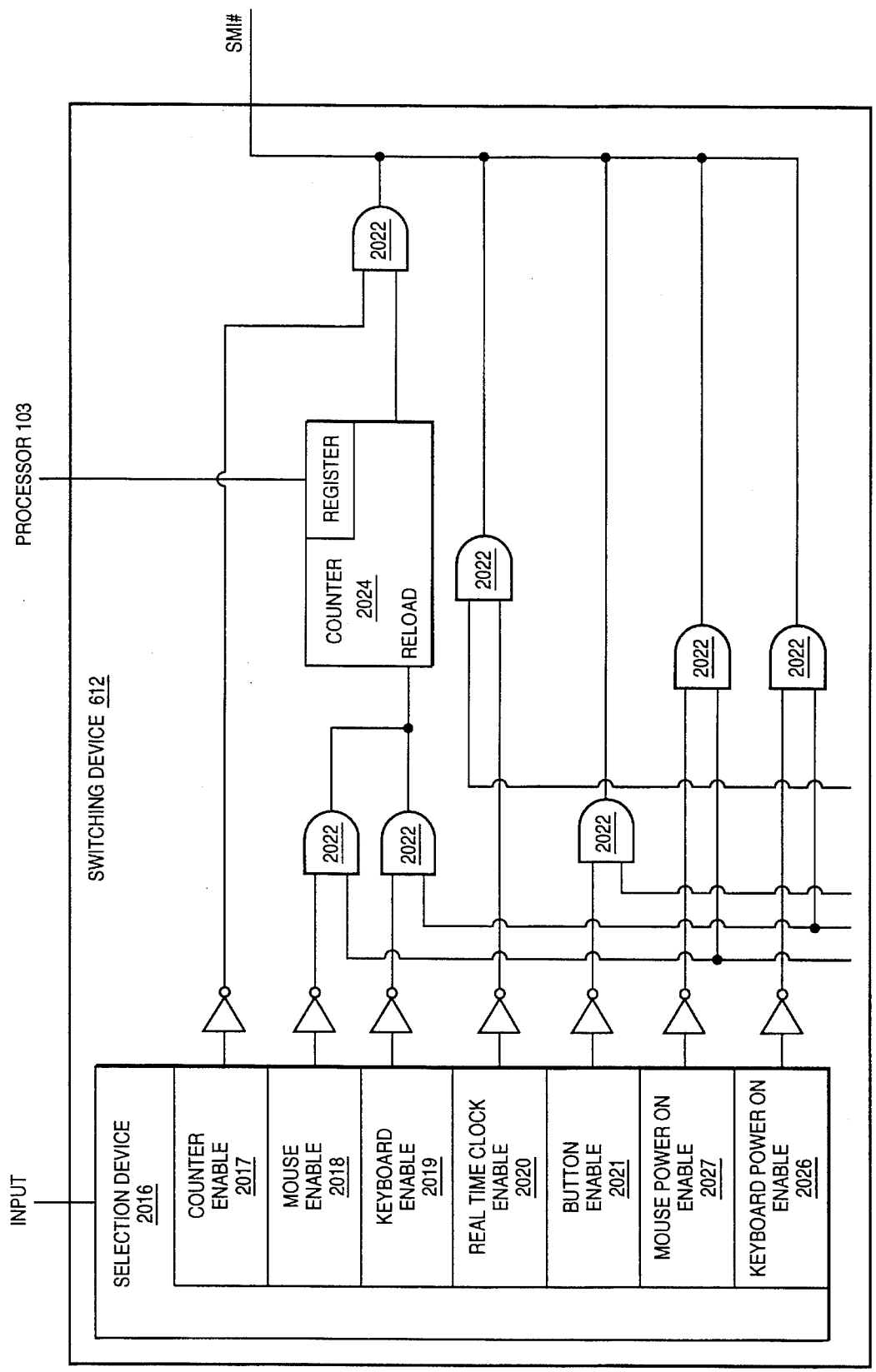
FIG_17

METHOD AND APPARATUS FOR INTERRUPT/SMI# ORDERING

FIELD OF THE INVENTION

The present invention relates to the field of electronic data processing devices. More particularly, the present invention relates to the control of interrupt request transmission.

BACKGROUND OF THE INVENTION

One prior computer system had an interrupt controller. The interrupt controller was coupled to peripheral components and also coupled to a processor. When a peripheral component needed the processor to perform an operation, it transmitted an interrupt request signal to the interrupt controller. The interrupt controller in turn then transmitted an interrupt request to the processor. The processor then determined the source of the interrupt request and serviced the interrupt. The prior computer system however, lacked power management features. When the prior computer system was left on, it remained in the fully operational mode despite long periods of inactivity.

Recently, in an effort to reduce power consumption by computer systems, the United States Environmental Protection Agency (EPA) established guidelines encouraging design and manufacture of computer systems which when left idle for an extended period, only consumed a specified amount of power or less. In conforming to the guidelines, the computer system must be placed in a low power mode after a specified idle period. One previously unrecognized problem is that when restoring the computer system after some activity has occurred, the interrupt request generated as a result of the activity may arrive before the processor has switched back to the fully operational mode. The computer system will then attempt to service the interrupt in the low power mode resulting in an inability to service the interrupt or in an inefficient servicing of the interrupt.

Thus, what is needed is a circuit that ensures that the computer system switches to a fully operational mode before servicing an interrupt.

SUMMARY OF THE INVENTION

A novel circuit for controlling interrupt request signal transmission is described. The circuit comprises an input for receiving an interrupt request signal from an external component and a first circuitry for generating a signal in response to the interrupt request signal from the external component. The signal generated by the signal generator causes a processor to switch to a fully operational mode. The circuit also comprises of a second circuitry for generating an interrupt request signal to the processor in response to the interrupt request signal from the external component and a signal processing circuit for suppressing transmission of the interrupt request signal to the processor until the signal is transmitted to the processor. Under an alternative embodiment, a circuit sets an enable bit for an interrupt request signal, receives an interrupt request signal from an external component, transmits a signal to a processor causing the processor to switch to a fully operational mode, suppresses an interrupt request signal to the processor, and transmits an interrupt request signal to the processor after transmitting the signal causing the processor to switch to a fully operational mode.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates in block diagram form a computer system of one embodiment of the present invention.

FIG. 2 illustrates in block diagram form an interrupt control unit of a second embodiment of the present invention.

FIG. 3 illustrates in logic diagram form an interrupt processing unit of a third embodiment of the present invention.

FIG. 4 illustrates in block diagram form a signal generator of a fourth embodiment of the present invention.

FIG. 5 illustrates in timing diagram form the operation of the pulse generator of FIG. 4.

FIG. 6 illustrates in state diagram form the operation of IRQ processing state machine of FIG. 3.

FIG. 7 illustrates in block diagram form an interrupt control unit of a fifth embodiment of the present invention.

FIG. 8 illustrates in state diagram form the operation of the SMI# signal state machine of FIG. 7.

FIG. 9 illustrates in state diagram form the operation of INTR signal state machine of FIG. 7.

FIG. 10 illustrates in flow chart diagram form the operation of an interrupt control unit of a sixth embodiment of the present invention.

FIG. 11 is a block diagram illustrating a computer system of a seventh embodiment of the present invention.

FIG. 12 is a state diagram illustrating the operation of a power consumption controller of FIG. 11.

FIG. 17 is a block diagram illustrating a switching device of an eighth embodiment of the present invention.

DETAILED DESCRIPTION

Figure 13:
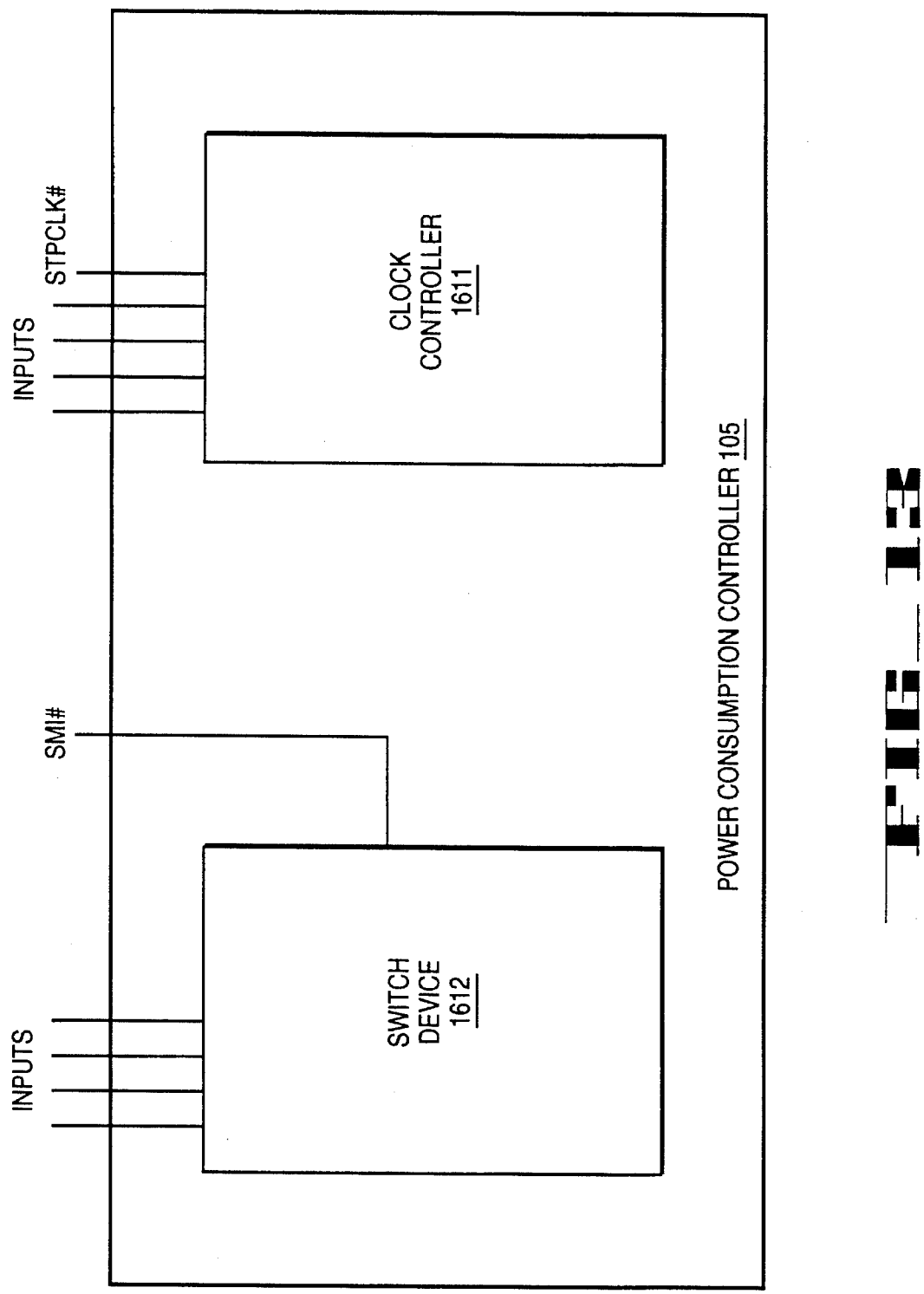
FIG. 13 is a block diagram illustrating the power consumption controller of FIG. 12.

A novel interrupt controller for controlling interrupt request signal transmission is described. In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantifies. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 illustrates in block diagram form a computer system of one embodiment of the present invention. The computer system comprises processor 103, interrupt control unit 110 and keyboard controller 111. The computer system can also comprise timer 112, floppy disk controller 113, serial port 114 and parallel port 115. Processor 103 executes instructions from an application program and performs data manipulation operations. Processor 103 can be a complex instruction set computing (CISC) microprocessor, reduced instruction set computing (RISC) microprocessor or other processor device. Processor 103 is coupled to interrupt control unit 110 which is in turn coupled to keyboard controller 111, timer 112, floppy disk controller 113, serial port 114 and parallel port 115. Interrupt control unit 110 acts as an interface between processor 103 and the other components. When one of the other components, either keyboard controller 111, timer 112, floppy disk controller 113, serial port 114 or parallel port 115 has an event which requires servicing by processor 103, the component transmits an interrupt request signal (IRQ) to interrupt control unit 110. Each IRQ signal is uniquely identified so that interrupt control unit 110 knows which component the IRQ signal originated from. When interrupt control unit 110 receives one or more IRQ signals, it first prioritizes the IRQ signals according to a priority scheme. It then passes the first interrupt request to processor 103 in accordance with the priority scheme by setting active the interrupt request (INTR) input of processor 103.

In this embodiment, the computer system incorporates power saving features. When the computer system is first turned on, the computer system and processor 103 boots up in the fully operational mode. When a low power event occurs, a system management interrupt (SMI#) signal is transmitted to processor 103. Processor 103 responds by running software called SMM Handler to switch to the responsive low power mode. Low power events are events which cause the switch to the responsive low power mode and are selectable at boot up of the system and/or by the application program. Low power events can include the expiration of elapsed time as indicated by a counter, the receipt of an external signal from a push button and a signal from a real time clock device indicating current time is the preset time for switching to the responsive low power mode. Processor 103 and the computer system remains in the responsive low power mode until a fully operational event occurs. Fully operational events are events which cause the switch to the fully operational mode and are also selectable at boot up of the system and/or by the application program. Fully operational events can include the expiration of elapsed time as indicated by a counter, the receipt of an external signal from a push button, a signal from a real time clock device indicating current time is the preset time for switching to the fully operational mode, activity on serial port 1, activity on serial port 2, input to a keyboard or input to a mouse device. Each of these events causes an associated component or controller to generate an IRQ signal to interrupt control unit 110.

However, when the computer system is in the responsive low power mode, before the computer system services a fully operational event, the computer system transitions to the fully operational mode. This transition allows the computer system to service the fully operational event. In transitioning to the fully operational mode, an SMI# signal is transmitted to processor 103. In response to the SMI# signal, processor 103 executes the SMM Handler code. The SMM Handler code causes processor 103 to "wake up" and causes the computer system to switch to the fully operational mode, thus enabling the computer system to process the event.

In this example, the associated component or controller can be keyboard controller 111, timer 112 or serial port 114. When interrupt control unit 110 receives an IRQ signal, it transmits an INTR signal to processor 103 asking processor 103 to service the interrupt. It also transmits a SMI# signal to processor 103 causing the computer system to switch to the fully operational mode so that it can service the interrupt. The computer system switches to the fully operational mode upon receipt of the SMI# signal by running the SMM Handler software. Processor 103 and the computer system must be in the fully operational mode in order to effectively service the interrupt. However, if the INTR signal from interrupt control unit 110 reaches processor 103 before the SMI# signal, processor 103 will attempt to service the interrupt in the responsive low power mode. In the responsive low power mode, processor 103 is unable to service the interrupt. Thus, interrupt control unit 110 also comprises a signal processing circuit which delays the INTR signal until the SMI# signal is transmitted. In this manner, the signal processing circuit in interrupt control unit 110 ensures that the computer system switches to the fully operational mode first then services the interrupt. It will be appreciated that interrupt control unit 110 can be a separate component or can reside in another component such as processor 103.

FIG. 2 illustrates in block diagram form an interrupt control unit of a second embodiment of the present invention. Interrupt control unit 210 comprises interrupt processing unit 221, gate bit 222, SMI enable bits 231 and interrupt controller 223. The signal processing circuit in interrupt control unit 210 for delaying the INTR signal comprises interrupt processing unit 221 and gate bit 222. Gate bit 222 is coupled to interrupt processing unit 221. Gate bit 222 is also coupled to processor 103 and can be set and cleared by processor 103 through the SMM Handler. Interrupt processing unit 221 receives IRQ signals from keyboard controller 111, timer 112, floppy disk controller 113, serial port 114 and parallel port 115. These interrupt request signals are labeled IRQ (A), IRQ (B), IRQ (C), IRQ (D) and IRQ (E). Interrupt processing for individual interrupt request signals can be enabled by setting the appropriate bit of SMI enable bits 231. Likewise, interrupt processing for individual interrupt request signals can be disabled by clearing the appropriate bit of SMI enable bits 231. SMI enable bits 231 are set and cleared by processor 103. It will be appreciated that additional circuitry can be added to interrupt processing unit 221 to receive additional IRQ signals from other components or controllers.

Interrupt processing unit 221 generates a SMI# signal to processor 103 and interrupt controller 223 generates an INTR signal to processor 103. Interrupt processing unit 221 also transmits interrupt request signals to interrupt controller 223. These interrupt request signals correspond to the interrupt request signals received from keyboard controller 111, timer 112, floppy disk controller 113, serial port 114 and parallel port 115. The interrupt request signals transmitted to interrupt controller 223 are labeled IRA(A)", IRQ(B)", IRQ(C)", IRQ(D)" and IRQ(E)". Interrupt processing unit 221 operates such that when gate bit 222 has a value of 1, interrupt processing unit 221 transmits a SMI# signal to processor 103 when it receives an interrupt request (IRQ) but does not transmit the corresponding interrupt request signal (IRQ") to interrupt controller 223. On the other hand, when gate bit 222 has a value of 0, interrupt processing unit 221 does not transmit a SMI# signal to processor 103 even if an interrupt request signal (IRQ) is received. Interrupt processing unit 221 suppresses the SMI# signal until gate bit 222 has a value of 1. Instead, interrupt processing unit 221 transmits an interrupt request signal (IRQ") to interrupt controller 223 which corresponds to the interrupt request signal (IRQ) previously received from keyboard controller 111, timer 112, floppy disk controller 113, serial port 114 or parallel port 115.

Interrupt controller 223 operates in response to interrupt processing unit 221. Interrupt controller 223 generates an INTR signal to processor 103 when interrupt controller 223 receives an IRQ(A)" signal, IRQ(B)" signal, IRQ(C)" signal, IRQ(D)" signal or IRQ(E)" signal from interrupt processing unit 221. When gate bit 222 has a value of 1, interrupt processing unit 221 does not transmit an IRQ" signal and thus, interrupt controller 223 does not transmit an INTR signal to processor 103 even if an IRQ is received. When gate bit 222 has a value of 0, interrupt processing unit 221 transmits to interrupt controller 223 the IRQ" signal corresponding to the previously received IRQ signal and in response, interrupt controller 223 transmits an INTR signal for the previously received IRQ signal. In addition, when gate bit 222 has a value of 0, interrupt processing unit 221 transmits to interrupt controller 223 the corresponding IRQ" signal when an IRQ is received and consequently, interrupt controller 223 generates an INTR signal when an IRQ signal is received.

It will be appreciated that gate bit 222 controls the transmission of the SMI# signal to processor 103 and also controls the transmission of INTR signal to processor 103. When the computer system is in the responsive low power mode, the computer system sets gate bit 222 to a value of 1. As described above, when interrupt processing unit 221 receives an IRQ signal, interrupt processing unit 221 transmits a SMI# signal to processor 103. However, interrupt controller 223 does not transmit an INTR signal in response to the IRQ signal. The SMI# signal transmitted to processor 103 causes processor 103 to run the SMM Handler software. As part of the SMM Handler code, processor 103 changes the value of gate bit 222 to 0. Interrupt controller 223 then transmits an INTR signal to processor 103 for the previous interrupt request signal (IRQ). In this manner, the INTR signal is not transmitted until after the SMI# signal is transmitted to processor 103.

Under an alternative embodiment, the instructions in the SMM Handler code do not instruct processor 103 to change the value of gate bit 222 to 0 until after the SMI# signal is serviced. Here, the INTR signal is not only delayed until after the SMI# signal is transmitted to processor 103 but also delayed until after the SMI# signal has been serviced by processor 103.

FIG. 3 illustrates in logic diagram form an interrupt processing unit of a third embodiment of the present invention. In this embodiment, interrupt processing unit 321 comprises a plurality of enable bits 331, a plurality of SMI# signal generators 340, OR gate 333 and AND gate 334. Each IRQ signal line for each IRQ signal is coupled to an enable bit 331 and a SMI# signal generator 340. In this embodiment, SMI# signal generator 340 comprises a pulse generator. Enable bits 331 allow processor 103 to select the events that are fully operational events in which a SMI# signal is generated to processor 103 to switch the computer system to a fully operational mode. Processor 103 selects the particular event to be a fully operational event by setting the enable bit 331 associated with that event to a 1. When an IRQ signal associated with that particular enable bit 331 and thus associated with that particular event, is received, a SMI# signal is transmitted to processor 103 if gate bit 322 has a value of 1. Each IRQ signal line identifies a separate event. When a particular enable bit 331 for a particular event has a value of 0 and thus indicating that processor 103 has not selected that event to be a fully operational event, an IRQ signal associated with that event will not cause a SMI# signal. In this manner, processor 103 can select particular events to be fully operational events and not select other events to be fully operational events. An IRQ signal associated with any fully operational event will cause a SMI# signal to be generated from OR gate 333 as long as gate bit 322 has a value of 1.

Interrupt processing unit 321 also comprises IRQ processing state machine 347. IRQ processing state machine 347 is coupled to gate bit 322, enable bits 331 and SMI# signal generators 340. SMI# signal generators 340 in addition to generating signals to OR gate 333, also generates an IRQ' signal to IRQ processing state machine 347 when SMI# signal generator 340 receives an IRQ signal. Interrupt processing unit 321 comprises one SMI# signal generator 340 for each of the IRQ(A), IRQ(B), IRQ(C), IRQ(D) and IRQ(E) signals to generate the IRQ(A)', IRQ(B)', IRQ(C)', IRQ(D)' and IRQ(E)' signals. The IRQ(A)', IRQ(B)', IRQ(C)', IRQ(D)' and IRQ(E)' signals are transmitted by the SMI# signal generators 340 to IRQ processing state machine 347. When IRQ processing state machine 347 receives an IRQ(A)', IRQ(B)', IRQ(C)', IRQ(D)' or IRQ(E)' signal, IRQ processing state machine 347 generates the respective IRQ" signal to processor 103 as long as gate bit 322 has a value of 0 or enable bit 331 for the IRQ signal has a value of 0. When gate bit 322 has a value of 1 and enable bit 331 for the IRQ signal has a value of 1, IRQ processing state machine 347 suppresses the IRQ" signal until gate bit 322 has a value of 0. In this embodiment, INTR signal generator 223 does not have enable bits. Thus, processor 103 does not select the events which cause an INTR signal. Any IRQ" signal can cause an INTR signal to be transmitted to processor 103.

FIG. 4 illustrates in block diagram form a signal generator of a fourth embodiment of the present invention. Only one IRQ signal line, IRQ (A) and one pulse generator is illustrated for ease of illustration. It will be appreciated that the circuitry is merely duplicated for additional IRQ signal lines. In this embodiment, SMI# signal generator 440 comprises pulse generator 441, enable bit 431 and D flip-flop 446. Pulse generator 441 in turn comprises of D flip-flop 442, delay buffer 443, D flip-flop 444 and NAND gate 445.

When interrupt control unit 110 receives an IRQ signal, the IRQ signal is transmitted to pulse generator 441. Pulse generator 441 synchronizes the IRQ signal and transforms the asynchronous IRQ signal into a synchronous pulse. In this manner, flip-flops in the circuit e.g. flip-flop 446, that receive the synchronous pulse instead of the asynchronous IRQ signal will be able to latch properly to a change in signal states. Pulse generator 441 also ensures that any intermediate change in signal states has the required set-up and hold times to allow proper operation of flip-flops in the circuit. When an intermediate change in signal states does not have the required set-up and hold times, pulse generator 441 transmits a lengthened pulse to satisfy the set-up and hold time requirements of the flip-flops in the circuit. In addition, pulse generator 441 transmits a pulse with a pulse width of approximately one clock cycle to the set input of flip-flop 446. Thus, even if the change in the signal state of the IRQ signal lasts more than one clock cycle, a pulse with a width of one clock cycle is transmitted by pulse generator 441. The one clock width pulse is utilized because it ensures that flip-flop 446 only latches to one signal state.

As described above, pulse generator 441 comprises of D flip-flop 442, delay buffer 443, D flip-flop 444 and NAND gate 445. D flip-flop 442 receives the IRQ signal e.g. IRQ (A) and synchronizes the signal with the clock signal. The synchronized output signal from D flip-flop 442 is then provided to delay buffer 443. Delay buffer 443 delays the synchronized signal from D flip-flop 442. The delayed output signal from delay buffer 443 is then provided to D flip-flop 444. D flip-flop 444 synchronizes the signal from delay buffer 443 with the clock signal. The complement of the output of D flip-flop 444 is transmitted to NAND gate 445. NAND gate 445 combines the complement signal from D flip-flop 444 with the synchronized output signal from D flip-flop 442. Because the complement signal from D flip-flop 444 is delayed by one clock cycle from the synchronized output signal from D flip-flop 443, the combination of the two signals through NAND gate 445 produces an active low pulse signal having a pulse width of one clock cycle. NAND gate 445 also has an input coupled to enable bit 431. Thus, when enable bit 431 has a value of 1, a pulse signal is generated by NAND gate 445 in response to an IRQ (A) signal. On the other hand, when enable bit 431 has a value of 0, the output of NAND gate 445 always remains high and no pulse signal is generated even if an IRQ (A) signal is received.

The pulse signal generated by NAND gate 445 is transmitted to the set input of D flip-flop 446. Thus, when the pulse signal is received at the set input of D flip-flop 446, an output signal is asserted high to OR gate 333.

In addition to supplying a pulse signal to D flip-flop 446, pulse generator 441 also supplies a delayed synchronized IRQ(A)' signal to IRQ processing state machine 347. D flip-flop 444 in pulse generator 441 transmits the delayed synchronized IRQ(A)' signal to IRQ processing state machine 347 of interrupt processing unit 321. Unlike the signal transmitted to D flip-flop 446, the delayed synchronized IRQ(A)' signal is not a pulse signal. Instead, it is merely a delayed version of the asynchronous IRQ(A) signal that has been synchronized with the clock signal and is transmitted to IRQ processing state machine 347.

FIG. 5 illustrates in timing diagram form the operation of the pulse generator of FIG. 4. D flip-flop 442 INPUT refers to the IRQ (A) signal received by D flip-flop 442. D flip-flop 442 OUTPUT refers to the synchronized signal transmitted by D flip-flop 442 to delay buffer 443. D flip-flop 444 OUTPUT refers to the signal transmitted by D flip-flop 444. D flip-flop 444 complement refers to the complement signal transmitted by D flip-flop 444 to NAND gate 445. Pulse signal refers to the pulse signal transmitted by NAND gate 445 to D flip-flop 446. In FIG. 5, the D flip-flop 442 INPUT signal is an asynchronous signal and can change signal states at any point in the clock cycle. D flip-flop 442 is a positive edge triggered flip-flop. Thus, it outputs a change in signal states after the rising edge of the clock signal and D flip-flop 442 OUTPUT signal is delayed until the next rising edge of the clock signal. Delay buffer 442 imposes an additional delay to the D flip-flop 442 OUTPUT signal. The additional delay causes D flip-flop 444 to wait until the next rising edge of the clock signal before outputting a change in signal states to D flip-flop 444 OUTPUT. The D flip-flop 444 complement signal is the complement of the D flip-flop 444 OUTPUT signal. When the D flip-flop 444 OUTPUT signal is high, the complement is low and vice versa. The pulse signal is a NAND combination of the D flip-flop 444 complement signal, D flip-flop 442 OUTPUT signal and the value in enable bit 431. When enable bit 431 has a value of 1, the pulse signal is merely the inversion of the rising edge of the D flip-flop 442 OUTPUT signal and the D flip-flop 444 complement signal. When enable bit has a value of zero, the pulse signal remains low.

FIG. 6 illustrates in state diagram form the operation of IRQ processing state machine of FIG. 3. When interrupt control unit 110 powers up, IRQ processing state machine 347 powers up in state 656. Here, it deasserts the IRQ(A)", IRQ(B)", IRQ(C)"IRQ(D)", and IRQ(E)" signals to interrupt controller 223. It remains in this state until IRQ(A)', IRQ(B)', IRQ(C)', IRQ(D)' or IRQ(E)' is asserted high and gate bit 222 has a value of 0 or enable bit 331 for the IRQ' signal has a value of 0. INTR signal state machine 347 then transitions to state 657, 658, 659, 660 or 661 as appropriate where it asserts the IRQ' signal to interrupt controller 223. It remains in state 657, 658, 659, 660 or 661 until IRQ(A)', IRQ(B)', IRQ(C)', IRQ(D)' and IRQ(E)' are asserted low. It then transitions back to state 656.

FIG. 7 illustrates in block diagram form an interrupt control unit of a fifth embodiment of the present invention. Only one IRQ signal line, IRQ (A) is illustrated for ease of illustration. It will be appreciated that the circuitry is merely duplicated for additional IRQ signal lines. In this embodiment, interrupt control unit 1010 comprises pulse generator 1040, interrupt processing unit 1021 and interrupt controller 1023. Pulse generator 1040 in turn comprises of D flip-flop 1041, delay buffer 1042, D flip-flop 1043 and NAND gate 1044. Interrupt processing unit 1021 comprises of D flip-flop 1045 and SMI# state machine 1046. Interrupt controller 1023 comprises INTR state machine 1047 and multiplexor 1048.

When interrupt control unit 1010 receives an IRQ signal, the IRQ signal is transmitted to pulse generator 1040. Pulse generator 1040 synchronizes the IRQ signal and transforms the asynchronous IRQ signal into a synchronous pulse. Pulse generator 1040 transmits a pulse with a pulse width of approximately one clock cycle to the set input of flip-flop 1045. Thus, even if the change in the signal state of the IRQ signal lasts more than one clock cycle, a pulse with a width of one dock cycle is transmitted by pulse generator 1040. The one clock width pulse is utilized because it ensures that flip-flop 1045 only latches to one signal state. This in turn ensures that when an IRQ signal is received and the INTR signal is asserted, the INTR signal will remain asserted until processor 103 has serviced the interrupt.

As described above, pulse generator 1040 comprises of D flip-flop 1041, delay buffer 1042, D flip-flop 1043 and NAND gate 1044. Pulse generator 1040 operates in a manner similar to pulse generator 441 of FIG. 4. The pulse signal generated by pulse generator 1040 is transmitted to interrupt processing unit 1021, in particular, the set input of D flip-flop 1045 in interrupt processing unit 1021. Processor 103 is coupled to the D input of D flip-flop 1045 and asserts the D input high. Thus, when the pulse signal is received at the set input of D flip-flop 1045, an output signal is asserted high to SMI# signal state machine 1046. SMI# signal state machine 1046 also receives the pulse signals generated from the IRQ (B), IRQ (C), IRQ (D) and IRQ (E) signals. When SMI# signal state machine 1046 receives any pulse signal as a result of an IRQ (A), IRQ (B), IRQ (C), IRQ (D) or IRQ (E) signal and gate bit 1022 has a value of 1, SMI# state machine 1046 generates an SMI# signal which is transmitted to processor 103. On the other hand, when the gate bit 1022 has a value of 0, no SMI# signal is transmitted to processor 103 under any circumstances. In this manner, processor 103 receives an SMI# signal causing it to switch to the fully operational mode.

In addition to supplying a pulse signal to interrupt processing unit 1021, pulse generator 1040 also supplies a delayed synchronized IRQ signal to interrupt controller 1023. D flip-flop 1043 in pulse generator 1040 transmits the delayed synchronized IRQ signal to INTR signal state machine 1047 of interrupt controller 1023. Unlike the signal transmitted to interrupt processing unit 1021, the delayed synchronized IRQ signal is not a pulse signal. Instead, it is merely a delayed version of the asynchronous IRQ signal that has been synchronized with the clock signal and is transmitted to INTR signal state machine 1047. INTR signal state machine 1047 is coupled to gate bit 1022 like SMI# signal state machine 1046 and is also coupled to enable bit 1031. When gate bit 1022 has a value of 0 and enable bit 1031 has a value of 1, INTR signal state machine 1047 asserts an output signal to multiplexor 1048 in response to a signal from D flip-flop 1043. When gate bit 1022 or enable bit 1031 has a value of 1, INTR signal state machine 1047 does not assert a signal to multiplexor 1048 despite any signals from D flip-flop 1043. Multiplexor 1048 has an input coupled directly to IRQ (A) and allows processor 103 to select a mode where the INTR signal is generated directly from the IRQ (A) signal and bypassing pulse generator 1040 and INTR signal state machine 1047. In this mode, an INTR signal is generated whenever an IRQ (A) signal is received by interrupt control unit 1010. In contrast, in the other mode, multiplexor 1048 only transmits an INTR signal when an output signal is asserted by INTR signal state machine 1047. It will be appreciated that a separate INTR signal state machine 1047 and multiplexor 1048 exists for each of the IRQ (B), IRQ (C), IRQ (D) and IRQ (E) signals. In this manner, the INTR signal is transmitted to processor 103 from an IRQ (A), IRQ (B), IRQ (C), IRQ (D) or IRQ (E) signal.

FIG. 8 illustrates in state diagram form the operation of the SMI# signal state machine of FIG. 7. When interrupt control unit 1010 powers up, SMI# signal state machine 1046 powers up in state 1151. Here, the SMI# signal is deasserted. SMI# signal state machine 1046 remains in this state until the output of D flip-flop 1045 for any of IRQ (A), IRQ (B), IRQ (C), IRQ (D) or IRQ (E) is asserted high while gate bit 1022 has a value of 1. SMI# signal state machine 1046 then transitions to state 1152 where it asserts the SMI# signal. It remains in this state until gate bit 1022 has a value of 0 where it transitions back to state 1151.

FIG. 9 illustrates in state diagram form the operation of INTR signal state machine of FIG. 7. When interrupt control unit 1010 powers up, INTR signal state machine 1047 powers up in state 1256. Here, it deasserts the signal to multiplexor 1048. It remains in this state until the output of D flip-flop 1043 is asserted high and gate bit 1022 has a value of 0 or enable bit 1031 has a value of 0. INTR signal state machine 1047 then transitions to state 1256 where it asserts the signal to multiplexor 1048. It remains in state 1257 until the output of D flip-flop 1043 is asserted low. It then transitions back to state 1256.

FIG. 10 illustrates in flow chart diagram form the operation of an interrupt control unit of a sixth embodiment of the present invention. In controlling interrupt signal transmission, interrupt control unit 110 first sets an enable bit for one or more interrupt request signals, either IRQ (A), IRQ (B), IRQ (C), IRQ (D) or IRQ (E). This is shown in block 1301. Interrupt control unit 110 then receives an interrupt request signal from an external component e.g. keyboard controller 111, timer 112, floppy disk controller 113, serial port 114 or parallel port 115. This is shown in block 1302. Interrupt control unit 110 then transmits a signal to processor 103 which causes the computer system to switch to a fully operational mode as shown in block 1303. This signal can be a SMI# signal described previously. While interrupt control unit 110 is transmitting the signal to processor 103 and for a short time period afterwards, interrupt control unit 110 delays the interrupt signal to processor 103 until the computer system is in a fully operational mode as shown in block 1304. This delay can be accomplished by setting a gate bit before transmitting the signal in block 1303 and clearing the gate bit after transmitting the signal in block 1303. After the delay, interrupt control unit 110 transmits an interrupt signal to processor 103 as shown in block 1305.

FIG. 11 is a block diagram illustrating a computer system of a seventh embodiment of the present invention. The computer system includes hard disk drive 101, random access memory (RAM) 102, processor 103, display device 104, power consumption controller 105 and communications device 106. Hard disk drive 101 and monitor 104 are coupled to processor 103 by bus 125. Processor 103 in turn is coupled to power consumption controller 105 by line 151. It will be appreciated that power consumption controller 105 can reside in other devices including processor 103. Power consumption controller 105 can also reside in interrupt control unit 110.

FIG. 12 is a state diagram illustrating the operation of a power consumption controller of FIG. 11. When the system is first turned on, the system transitions from the power off state 1534 to the power on state 1535 where the system is in the fully operational mode. Power consumption controller 105 remains in the fully operational mode until the power switch is turned off or a low power event occurs. When power switch is turned off, controller 105 transitions to the power off state where controller 105 along with the rest of the system is turned off. On the other hand, when the power switch is not turned off, power consumption controller 105 waits for a low power event. Low power events are events which cause the switch to the responsive low power mode and are selectable at boot up of the system or by processor 103. Low power events can include the expiration of elapsed time as indicated by a counter, the receipt of an external signal from a push button (EXTSMI#), and a software induced SMI# event. It will be appreciated that other events can also be selected as low power events.

Power consumption controller 105 responds to a low power event by asserting a SMI# signal to processor 103, state 1536. Processor 103 responds by running software called SMM Handler as shown in state 1528. SMM Handler includes code that processor 103 executes to instruct the hard disk to spin down and the monitor to turn off or reduce intensity. Processor 103 then executes the SMM Handler code to switch to the responsive low power mode, state 1537. In the responsive low power mode, controller 105 deasserts an active high STPCLK# signal to processor 103 for a first specified duration and asserts STPCLK# signal to processor 103 for a second specified duration. While controller 105 remains in the responsive low power mode, it repeats the assertion and deassertion of STPCLK# signal in the manner described above. Processor 103 responds to the assertion of STPCLK# signal by suppressing the clock signal to a portion or all of processor 103. Processor 103 responds to the deassertion of STPCLK# signal by allowing the clock signal to the suppressed portion of processor 103. It will be appreciated that processor 103 is at least partially off for the second specified duration while STPCLK# signal is asserted and operating at full capacity for the first specified duration while STPCLK# signal is deasserted. Because processor 103 is at least partially off for the second specified duration in each cycle, power consumption is reduced. In addition, because processor 103 is operating at full capacity for the first specified duration in each cycle, processor 103 is responsive to signals from communications device 106 during the first specified duration. Thus, it will be appreciated that processor 103 will be sufficiently responsive to remain on a network where the time between each network poll is greater than the first specified duration plus the second specified duration. It will also be appreciated that processor 103 will be sufficiently responsive to remain on a network where the first specified duration and second specified duration are set such that processor 103 can acknowledge within the latency period.

Power consumption controller 105 remains in the responsive low power mode until the power switch is turned off or a fully operational event occurs. When power switch is turned off, controller 105 transitions to the power off state where controller 105 along with the rest of the system is turned off, state 1534. On the other hand, when a fully operational event occurs, controller 105 asserts a second SMI# signal, state 1538. Fully operational events are events which cause the switch to the fully operational mode and like low power events are selectable by processor 103. Fully operational events can include movement of a mouse device, input to a keyboard, the receipt of an external signal from a push button (EXTSMI#), and a signal from a real time clock device indicating current time is the preset time for switching to fully operational mode. It will be appreciated that other events can also be selected as fully operational events.

As described above, controller 105 responds to a fully operational event by asserting a second SMI# signal to processor 103, state 1538. Processor 103 responds by running the SMM Handler software, state 1529. SMM Handler includes code that processor 103 executes to instruct the hard disk to spin up and the monitor to turn on to normal intensity. Processor 103 then executes SMM Handler code to switch to the fully operational mode, state 1535. In the fully operational mode, controller 105 no longer asserts the STPCLK# signal and processor 103 remains fully operational. Controller 105 operates in the fully operational mode as described above.

FIG. 13 is a block diagram illustrating the power consumption controller of FIG. 12. Power consumption controller 105 includes switching device 1612 and clock controller 1611. Switching device 1612 is coupled to inputs from processor 103 and other devices in the computer system. The other devices can include a mouse device, keyboard, low power mode button, real time clock or other similar devices. In addition, processor 103 also has inputs to clock controller 1611. Switching device 1612 switches the computer system between a fully operational mode and a responsive low power mode by asserting a SMI# signal. As described above, when the computer system is in the fully operational mode, an assertion of a SMI# signal switches the computer system to a responsive low power mode. On the other hand, when the computer system is in the responsive low power mode, an assertion of a SMI# signal switches the computer system to a fully operational mode.

In this embodiment, switching device 1612 asserts the SMI# signal to processor 103 using line 151. However, under an alternative embodiment, switching device 1612 can also assert the SMI# signal to processor 103, clock controller 1611 or to other devices in the computer system such as monitor 104 or hard disk drive 101. In addition, switching device 1612 can assert the SMI# signal on bus 125 to a separate device which asserts another SMI# signal directly to processor 103 on a dedicated line. When processor 103 receives the SMI# signal, it signals clock controller 1611 to switch it to a responsive low power mode if it was previously in a fully operational mode; it signals clock controller 1611 to switch it to a fully operational mode if it was previously in a responsive low power mode. As described above, in the responsive low power mode, clock controller 1611 asserts STPCLK# signal to processor 103 for a second specified duration and deasserts STPCLK# signal to processor 103 for a first specified duration. In the fully operational mode, clock controller 1611 no longer asserts STPCLK# signal and processor 103 remains fully operational.

Figure 14:
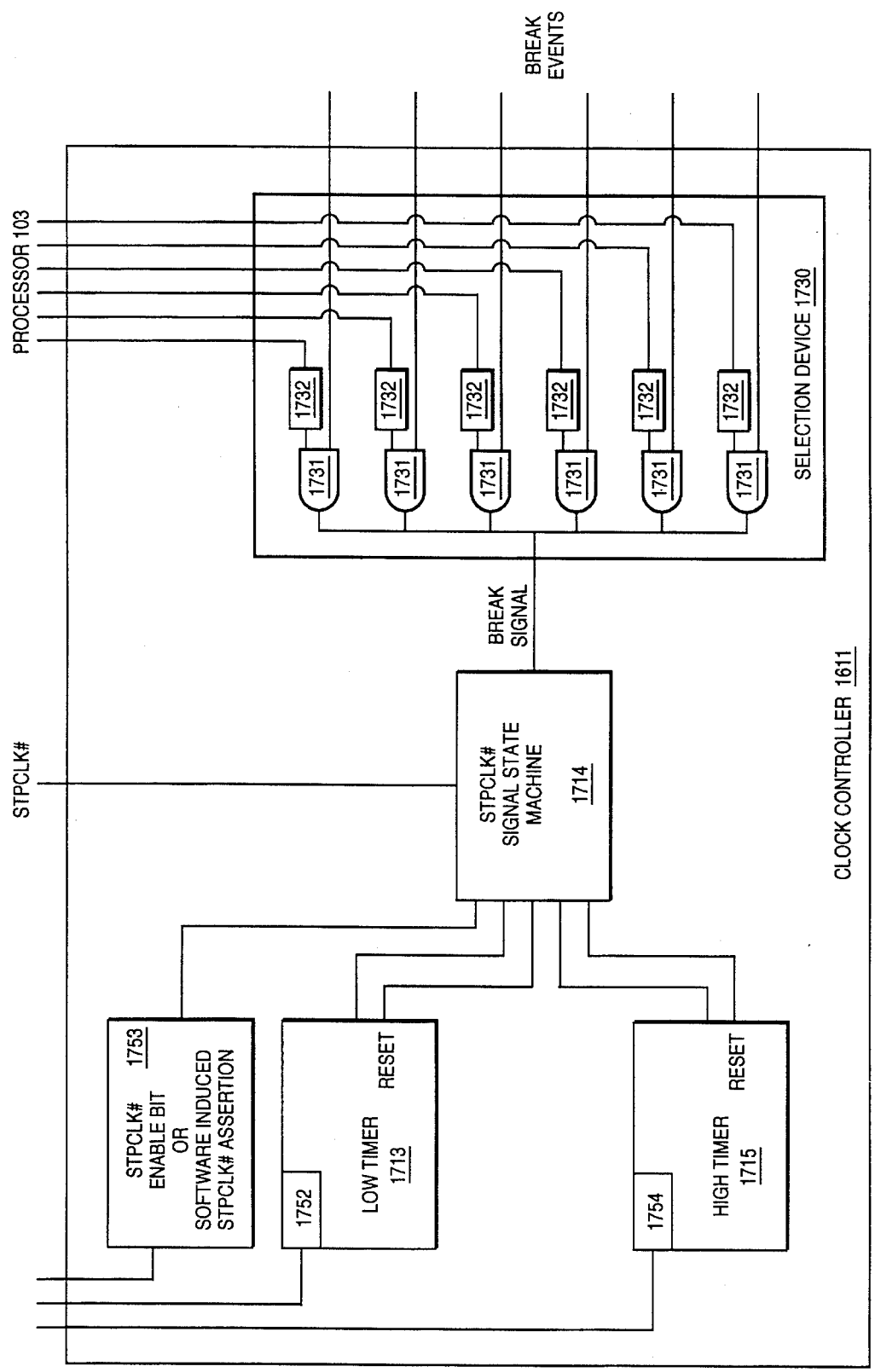
FIG. 14 is a block diagram illustrating a clock controller of FIG. 13.

FIG. 14 is a block diagram illustrating a clock controller of FIG. 13. Clock controller 1611 comprises of STPCLK# enable bit 1753, low timer register 1752 and high timer register 1754 which are all coupled to processor 103. Clock controller 1611 also comprises of low timer 1713, high timer 1715 and STPCLK# signal state machine 1714. When the computer system is in the fully operational mode, a SMI# signal asserted by switching device 1612 to processor 103 causes processor 103 to run the SMM Handler code. In executing the instructions, processor 103 loads the second specified duration into low timer register 1752 and the first specified duration into high timer register 1754. Processor 103 sets STPCLK# enable bit. In this embodiment, the first specified duration and the second specified duration range from 32 microseconds to eight milliseconds in 32 microsecond increments. It is to be appreciated that clock controller 1611 can utilize other ranges by utilizing other high timers and low timers with different clock pulses.

When processor 103 loads low timer register 1752 and high timer register 1751, it resets both low timer 1713 and high timer 1715. When processor 103 sets STPCLK# enable bit 1753, STPCLK# signal state machine 1714 asserts STPCLK# signal. The setting of STPCLK# enable bit 1753 marks the beginning of the responsive low power mode. STPCLK# signal state machine 1714 continues to assert the STPCLK# signal until low timer 1713 signals the end of the second specified duration. When low timer 1713 expires, STPCLK# signal state machine 1714 resets high timer 1715 and deasserts the STPCLK# signal until high timer 1715 signals the end of the first specified duration. When high timer 1715 expires, STPCLK# signal state machine 1714 resets low timer 1713 and asserts STPCLK# until low timer 1713 expires. The cycle continues until switching device 1612 asserts a SMI# signal to processor 103 causing processor 103 to run the SMM Handler code. In executing the instructions, processor 103 clears STPCLK# enable bit 1753 which in turn causes the STPCLK# signal state machine 1714 to deassert the STPCLK# signal. STPCLK# signal remains deasserted until a subsequent switch to the responsive low power mode. The clearing of STPCLK# enable bit 1753 marks the beginning of the fully operational mode.

The cycle described above can also be interrupted by a break event. Clock controller 1611 comprises of selection device 1730 coupled to a plurality of break event lines. Selection device 1730 in turn comprises of AND gate 1731 and break event enable bits 1732 coupled to processor 103. When a break event occurs, a break event signal is asserted on a break event line. Break events can include a network signal that the processor must service immediately or other operations which require immediate processor activity. When a break event signal is asserted, AND gate 1731 generates a break signal if the associated enable bit 1732 is set. Thus, processor 103 can select the break events that generate a break signal by selectively setting the associated enable bits 1732. Processor 103 carries out the selection by utilizing the SMM Handler code which it runs prior to the assertion and deassertion of STPCLK# signal. When STPCLK# signal state machine 1714 receives a break signal, STPCLK# signal state machine 1714 resets high timer 1715 and deasserts STPCLK# signal for the first specified duration. It will be appreciated that a break event with the enable bit set causes STPCLK# signal state machine 1714 to immediately deassert the STPCLK# signal for the first specified duration when clock controller 1611 is in the responsive low power mode.

Figure 15:
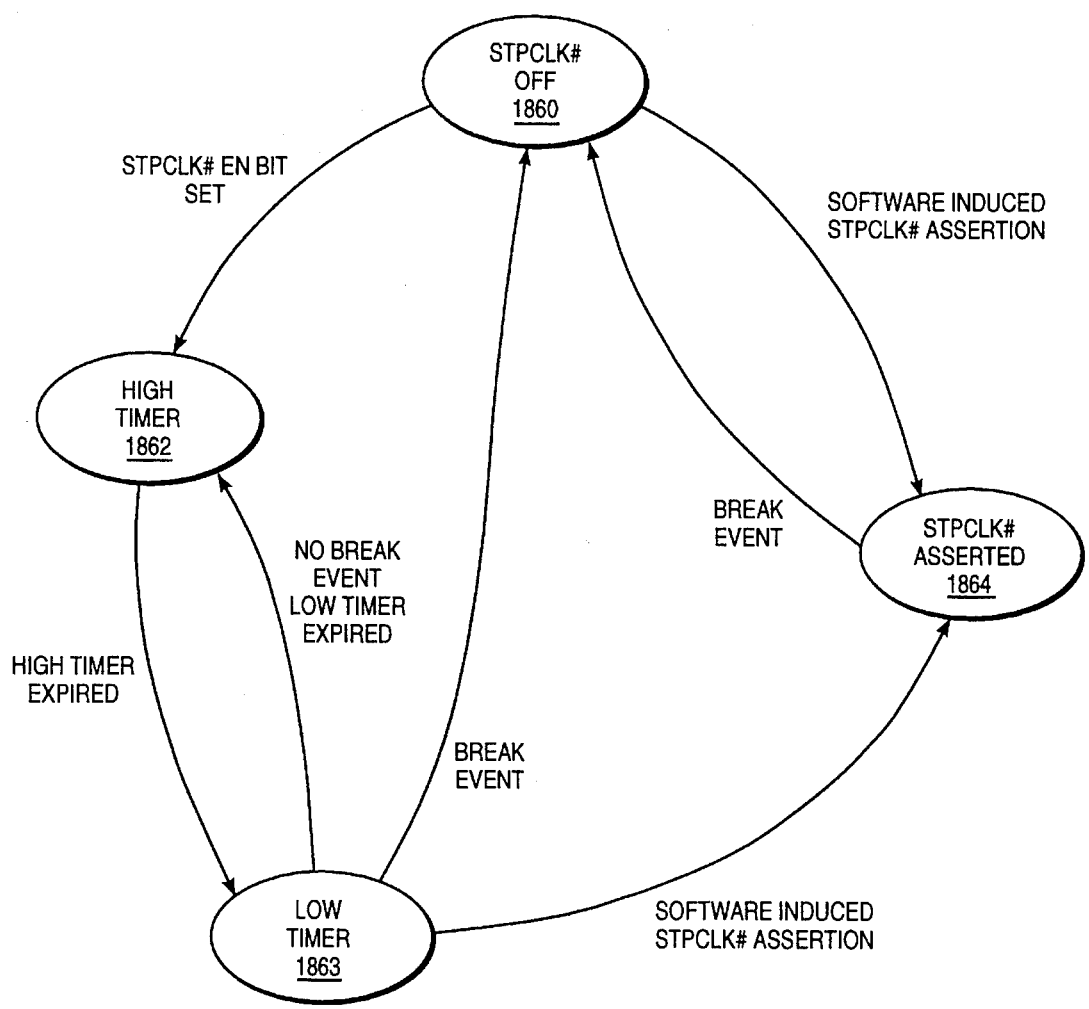
FIG. 15 is a state diagram illustrating the operation of STPCLK# signal state machine of FIG. 14.

FIG. 15 is a state diagram illustrating the operation of STPCLK# signal state machine of FIG. 14. When the computer system powers up, STPCLK# signal state machine 1714 transitions to the fully operational mode, state 1860. In this state, STPCLK# is deasserted. When processor 103 receives an SMI# signal, it runs SMM Handler. In executing SMM Handler, processor 103 loads the low timer register with the second specified duration and loads high timer register with the first specified duration, sets the desired break event enable bits and sets the STPCLK# enable bit. State machine 1714 then transitions to state 1862 with low timer and high timer already reset. In state 1862, state machine 1714 deasserts the STPCLK# signal. When high timer 1715 expires, state machine 1714 transitions to state 1863 where state machine 1763 resets low timer 1713 and asserts the STPCLK# signal. If state machine 1714 receives a break signal indicating a break event, state machine 1714 transitions back to state 1860. If low timer 1713 expires and state machine 1714 does not receive a break signal, state machine 1714 transitions back to state 1862 where it resets high timer 1715. If state machine 1714 receives a signal indicating a software induced STPCLK# assertion, state machine 1714 transitions to state 1864. In state 1864, the STPCLK# signal is asserted.

In state 1860, if state machine 1714 receives a signal indicating a software induced STPCLK# assertion, state machine 1714 transitions to state 1864 where the STPCLK# signal is asserted. When state machine 1714 receives a break signal indicating a break event, state machine 1714 transitions back to state 1860.

Figure 16:
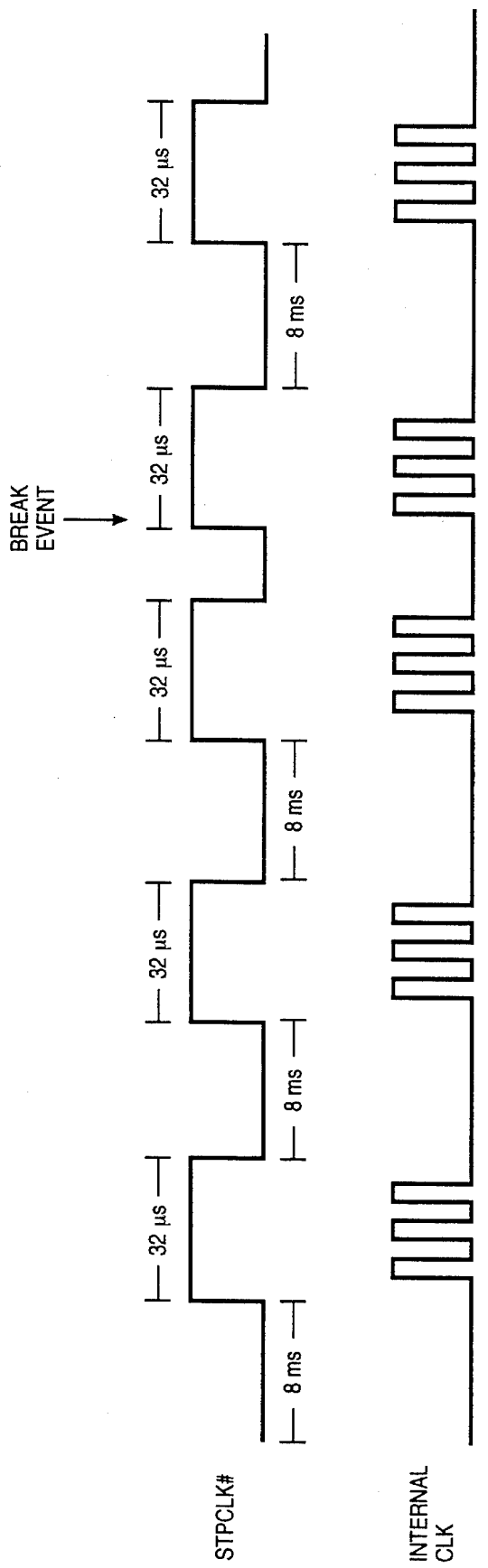
FIG. 16 is a timing diagram illustrating the operation of a clock controller of FIG. 14.

FIG. 16 is a timing diagram illustrating the operation of a clock controller of FIG. 14. In the responsive low power mode as described above, clock controller 1611 asserts active low STPCLK# signal for a second specified duration and deasserts STPCLK# signal for a first specified duration. In this example, the second specified duration is eight milliseconds and the first specified duration is 32 microseconds. When STPCLK# is asserted, internal processor CLK is suppressed and when STPCLK# is deasserted, internal processor CLK is transmitted. Clock controller 1611 also has circuitry allowing it to respond to break events. When a break event occurs as shown in FIG. 16, STPCLK# signal is deasserted for the first specified duration of 32 microseconds. Afterwards, STPCLK# signal is asserted for the second specified duration of eight milliseconds. It will be appreciated that the break event only affects the second specified duration of one cycle. Subsequent cycles continue unaffected by the break event.

The assertion of a STPCLK# signal as described above suppresses the internal clock to portions of processor 103 because processor 103 has circuitry which enables the suppression. In one embodiment, processor 103 includes a plurality of functional blocks each performing a specified function in processor 103. Each functional block has a clock input coupled to an AND gate with two inputs to the gate. One input is coupled to the internal clock signal and the second input is coupled to the output of a NAND gate. Each NAND gate also has two inputs. One coupled to an inverted STPCLK# input line and the second coupled to a line connected to either a high or low voltage potential. The line is connected during the manufacture of processor 103 and determines whether clock suppression is enabled for that functional block. It will be appreciated that when the line is connected to a high voltage potential, clock suppression will never occur in that particular functional block. On the other hand, when the line is connected to a low voltage potential, clock suppression will occur when STPCLK# signal is asserted. In this manner, portions of processor 103 can be selected at manufacture for dock suppression. Under yet another embodiment, the second input of each NAND gate can be coupled to an enable bit. The enable bits act as a selection mechanism allowing processor 103 or other device to select and modify the particular functional block for clock suppression.

FIG. 17 is a block diagram illustrating a switching device of an eighth embodiment of the present invention. Switching device 1612 includes counter 2024 and selection device 2016. Counter device 2024 is activated when the computer system is powered up and begins counting elapsed time. Because the computer system powers up in the fully operational mode, the elapsed time maintained by counter device 2024 is the elapsed time since the start of the fully operational mode. Counter device 2024 includes a register for storing a preassigned value representing a specified elapsed time. Counter device 2024 also includes a comparator for comparing the preassigned value to the elapsed time. When the elapsed time equals the preassigned value, an active low signal is generated which becomes the SMI# signal. Counter device 2024 has a reload input coupled to the mouse device, and keyboard. When a signal is transmitted from either of the mouse device or keyboard, the counter is reset and starts counting the elapsed time from initial value. The counter is also reset to initial value when processor 103 loads the register with the preassigned value prior to the beginning of the fully operational mode. Thus, at the initiation of the fully operational mode, counter 2024 is reset. Counter 2024 is also reset when an input to the keyboard is made or when mouse movement is detected. In this manner, counter 2024 measures the elapsed time between the last mode switch or keyboard input or mouse movement and asserts a SMI# signal when the elapsed time equals a preassigned value. In this manner, human interface through a keyboard or mouse reloads the counter which ensures that processor 103 is fully active and operative during such use.

Under other embodiments, switching device 1612 also includes a real time clock device. The real time clock device has a register for storing a preassigned value representing a specified real time. In addition, the real time clock device has a comparator for comparing the preassigned value to the input provided by the real time clock. When the real time as indicated by the real time clock equals the preassigned value, an active low SMI# signal is asserted. In this manner, the real time clock device asserts a SMI# signal to switch modes when real time has reached a preassigned value. Under this embodiment though, the real time clock device is external to switching device 1612 and transmits the active SMI# signal as an input to switching device 1612.

Finally, switching device 1612 includes selection device 2016. Selection device 2016 includes a plurality of enable bits. The enable bits allows the functional parameters of the power consumption controller to be selected and modified. Selection device 2016 is coupled to an input line from which the enable bits can be set or cleared by processor 103 or other devices. Each of the enable bits is coupled to an AND gate 2022 located between the associated device and the SMI# signal output. Thus, when a particular enable bit is set, SMI# signals generated by the associated device is transmitted to processor 103. On the other hand, when a particular enable bit is cleared, SMI# signals generated by the associated device is suppressed. In this example, selection device 2016 includes counter enable bit 2017, mouse counter reset enable bit 2018, keyboard counter reset enable bit 2019, real time clock enable bit 2020, button enable bit 2021, mouse power on enable bit 2027 and keyboard power on enable bit 2026. Other enable bits representing other events can also be included.

When the computer system powers up, it transitions to the fully operational mode. In the fully operational mode, processor 103 or another device can set counter enable bit 2017, mouse counter reset enable bit 2018, keyboard counter reset enable bit 2019, real time clock enable bit 2020, and button enable bit 2021. Processor 103 or the other device can clear mouse power on enable bit 2027 and keyboard power on enable bit 2026. With this set of functional parameters, counter 2024 is activated and the SMI# signal when generated is transmitted to processor 103. In addition, mouse movement and keyboard input while the system is in the fully operational mode will reset counter 2024 because bits 2018 and 2019 are set. Moreover, the real time clock device can generate a SMI# signal that is transmitted to processor 103. Furthermore, the computer system can include an external button which when pressed generates an active low EXTSMI# signal. When the EXTSMI# signal is asserted, an SMI# signal is also asserted because bit 2021 is set. It is to be appreciated that the assertion of a SMI# signal causes the computer system to transition to the responsive low power mode. Mouse movement and keyboard input do not generate a SMI# signal because bits 2027 and 2026 are cleared.

Before the system transitions to the responsive low power mode, processor 103 or another device can clear counter enable bit 2017, mouse counter reset enable bit 2018, and keyboard counter reset enable bit 2019. Processor 103 or the other device can set mouse power on enable bit 2027, keyboard power on enable bit 2026, real time clock enable bit 2020, and button enable bit 2021. With this set of functional parameters, counter 2024 is deactivated. Mouse movement, keyboard input and the pressing of the EXTSMI# button will generate a SMI# signal. The real time clock device can also generate a SMI# signal that will be transmitted to processor 103. The SMI# signal causes the computer system to transition back to the fully operational mode as described above. The specified real time can be changed in the responsive low power mode and in the fully operational mode. The real time clock device can include an input coupled to processor 103 or other device which allow them to change the preassigned value representing the specified real time in the real time clock device. Thus, a first real time can be assigned in the fully operational mode to transition the system to the responsive low power mode at the first real time and a second real time can be assigned in the responsive low power mode to transition the system to the fully operational mode at the second real time.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for controlling interrupt request transmission has been described.

What is claimed is:

1. A circuit for controlling interrupt request signal transmission in a computer system comprising:

an input for receiving an interrupt request signal from an external component;

first circuitry coupled to said input for generating a system management interrupt (SMI) signal in response to said interrupt request signal from said external component wherein said SMI signal causes a processor to switch to a fully operational mode;

second circuitry coupled to said input for generating an interrupt request signal to said processor in response to said interrupt request signal from said external component; and a signal processing circuit coupled to said second circuitry for suppressing transmission of said interrupt request signal to said processor until said SMI signal is transmitted to said processor.

2. The circuit of claim 1 wherein said signal processing circuit comprises a gate bit, wherein said second circuitry suppresses transmission of said interrupt request signal to said processor when said gate bit has a first value and wherein said second circuitry generates said interrupt request signal to said processor in response to said interrupt request signal from said external component when said gate bit has a second value.

3. The circuit of claim 2 wherein said gate bit is coupled to said processor and can be set and cleared by said processor.

4. The circuit of claim 2 wherein said first circuitry generates said SMI signal in response to said interrupt request signal when said gate bit has a first value and wherein said first circuitry suppresses said SMI signal when said gate bit has a second value.

5. The circuit of claim 1 wherein said SMI signal causes said processor to switch to a low power mode.

6. The circuit of claim 1 wherein said circuit resides in an interrupt controller.

7. The circuit of claim 1 wherein said first circuitry comprises an enable bit for enabling said first circuitry to generate said SMI signal in response to said interrupt request signal.

8. The circuit of claim 1 wherein said first circuitry receives a plurality of interrupt request signals from a plurality of external components and wherein said first circuitry comprises a plurality of enable bits for selecting interrupt request signals from external components which cause said SMI signal to be generated.

9. A method for controlling interrupt signal transmission in a computer system comprising the steps of:

setting an enable bit for an interrupt request signal;

receiving an interrupt request signal from an external component;

transmitting a system management interrupt (SMI) signal to a processor causing said processor to switch to a fully operational mode;

suppressing an interrupt request signal to said processor; and transmitting an interrupt request signal to said processor after transmitting said SMI signal causing said processor to switch to a fully operational mode;

transmitting said SMI signal when said processor is in a fully operational mode, causing said processor to switch to a low power mode.

10. The method of claim 9 further comprising the steps of: setting a gate bit before transmitting said SMI signal; and clearing said gate bit after transmitting said SMI signal.

11. The method of claim 9 further comprising the step of selecting events which cause said SMI signal to be transmitted.

* * * * *

UNITED STATES PATENT AND TRADEMARK OFFICE
CERTIFICATE OF CORRECTION

PATENT NO. : 5,551,044
DATED : August 27, 1996
INVENTOR(S) : Shah et al.

It is certified that error appears in the above-indentified patent and that said Letters Patent is hereby corrected as shown below:

In column 3 at line 1 delete "quantifies." and insert --quantities.--

In column 8 at line 60 delete "dock cycle" and insert --clock cycle--

In column 9 at line 8 delete "D flip-flop." and insert --D flip-flop,--

In column 14 at line 30 delete "dock" and insert --clock--

In column 15 at line 22 delete "0n" and insert --On--

Signed and Sealed this

Twenty-sixth Day of November 1996

Attest:

BRUCE LEHMAN

*Attesting Officer*        *Commissioner of Patents and Trademarks*